(No Model.)

W. STRAIT.
RAKE.

No. 503,625. Patented Aug. 22, 1893.

Witnesses

Inventor
William Strait
by Fenelon B. Brock
Attorney

UNITED STATES PATENT OFFICE.

WILLIAM STRAIT, OF ELMIRA, NEW YORK.

RAKE.

SPECIFICATION forming part of Letters Patent No. 503,625, dated August 22, 1893.

Application filed September 24, 1892. Serial No. 446,768. (No model.)

*To all whom it may concern:*

Be it known that I, WILLIAM STRAIT, a citizen of the United States, residing at Elmira, in the county of Chemung and State of New York, have invented certain new and useful Improvements in Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to horse hay rakes.

The object of my invention is to provide a draft-dumping hay rake having oscillating cleaner-bars with an automatic mechanism which will, upon the elevation of the cleaner-bars by means of a lever, act to interlock the rake teeth when they are thrown up to dump the rake, so that both the cleaner-bars and the rake teeth may be held up together for an indefinite length of time for the purpose of backing the rake in over a windrow of hay lying in an ordinarily inaccessible place—such as a fence corner or the like.

To attain these objects my invention consists in the following construction and combination of parts which will first be fully described in detail and the features of novelty then set forth in the claims.

Figure 1:
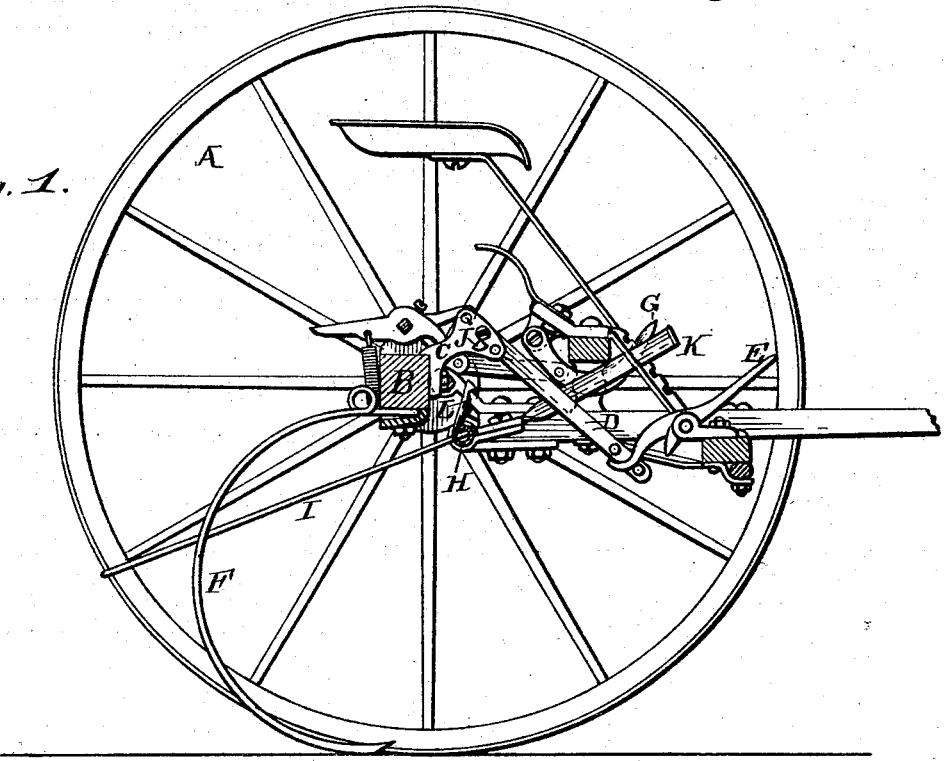
Figure 2:
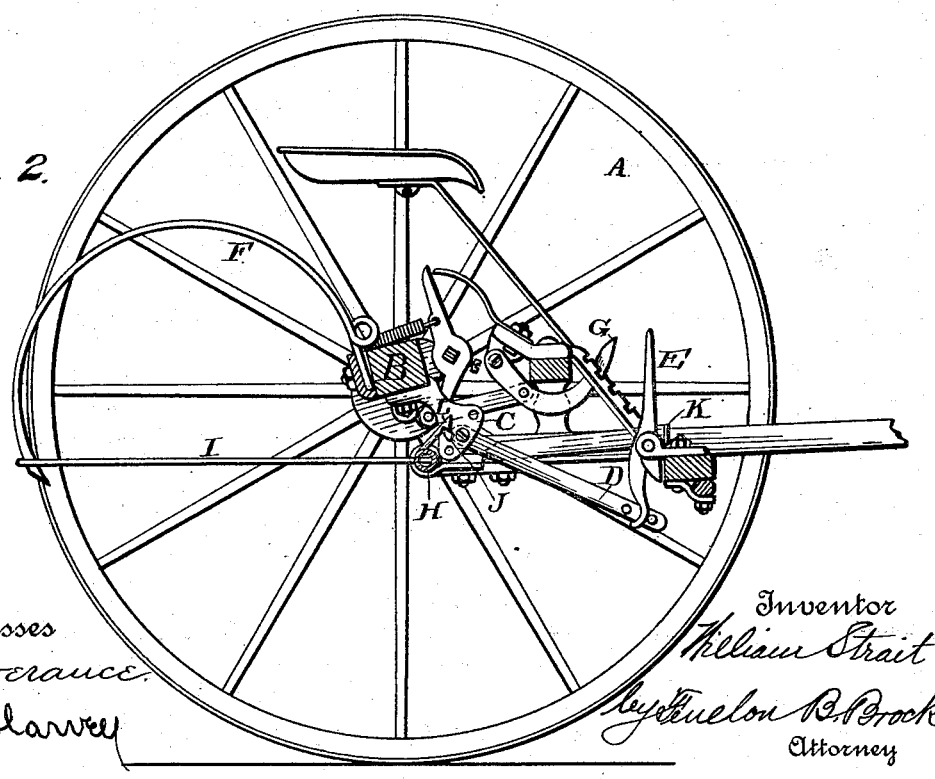

Figure 1 represents a transverse sectional view of a rake to which I have applied my improvements, showing the rake-teeth and cleaner-bars in position for raking. Fig. 2 is a similar transverse section showing the teeth and cleaner-bars thrown up and interlocked for the purposes above described.

In the drawings—A represents the wheels of a rake.

B is the rake-head.

C is an arm carried by the head, pivotally connected to a link-bar D and a treadle E, by means of which the rake teeth are held down in position for raking.

F are the rake teeth.

G represents a lever connected with a link mechanism, by means of which the usual dogs on the rake head are thrown into engagement with the ratchet on the wheels for the purpose of automatically dumping the rake.

H is the oscillating bar hung in suitable bearings in the rake frame and to which the cleaner bars I are rigidly secured.

K is the lever-treadle secured to the oscillating bar H, the depression of which by the foot causes the cleaner bars I to be elevated.

For the purpose of interlocking the rake-head and teeth and holding the same up in connection with the cleaner-bars, when the latter are raised, I provide a lug or piece J upon the arm C and a hook projection L upon the cleaner-bar rod H, which lug, upon the rotation of the rake-head, comes into contact with the hook L, the latter sliding past the lug and springing over the same. The hook L is preferably rigidly secured to the rod H but it may be of a yielding spring structure if desired. When rigid with the bar H, the lug J, coming in contact with the hook, may raise the foot lever K against the pressure of the foot sufficient to permit the hooks L and J to interlock. The hook L may also be given sufficient lateral flexure by the torsional strain on the rod H to enable it to spring over the lug J. To effect this operation the foot is first placed upon the lever G thereby throwing the rake-head dumping mechanism into operation. The foot is then placed upon the lever K depressing the same and elevating the cleaner bars. In this position the hook L lies in the path of the lug J, and the latter will engage the hook when the rake teeth are elevated, and both cleaner bars and rake teeth will be held up so long as the foot is upon the lever K. Upon taking the foot from said lever both the rake teeth and the cleaner bars instantly fall, the locking engagement being released. In this last named position the rake teeth and the cleaner bars are in their normal condition for raking.

It should be clearly understood that a lug or catch similar to J, may be placed in any suitable position upon the rake head, and in like manner a hook similar to L may be placed in any suitable position upon the cleaner-bar mechanism, so that provision is made for the interlocking engagement of the two under the conditions substantially as above set forth.

I claim—

1. In a rake, the combination of a cleaner bar mechanism and a dumping rake teeth mechanism, of interlocking pieces upon the cleaner-bar and draft-dumping mechanism, by means of which the teeth and the cleaner-bars are held up.

2. In a rake, the combination of a rake head having an arm carrying a locking piece thereon, a cleaner-bar provided with a locking piece thereon, and a lever upon the cleaner-bar for holding the rake head and cleaner bar up and interlocked.

In testimony whereof I affix my signature in presence of two witnesses.

WM. STRAIT.

Witnesses:
  FENELON B. BROCK,
  GEO. W. HARVEY.